March 6, 1928.

P. N. BOSSART 1,661,651

ELECTROMAGNETIC APPARATUS

Filed Sept. 10, 1927

INVENTOR:
P. N. Bossart

Patented Mar. 6, 1928.

1,661,651

UNITED STATES PATENT OFFICE.

PAUL N. BOSSART, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTROMAGNETIC APPARATUS.

Application filed September 10, 1927. Serial No. 218,810.

My invention relates to electromagnetic apparatus, and particularly to apparatus of the type involving a direct current electromagnet operated from a source of alternating current through asymmetric units.

One feature of my invention is the provision of apparatus of this character wherein the sensitivity of a direct current magnet is preserved and yet the speed of operation of an alternating current magnet is obtained.

I will describe one form of apparatus embodying my invention, and will then point out the novel features thereof in the claim.

Figure 1:
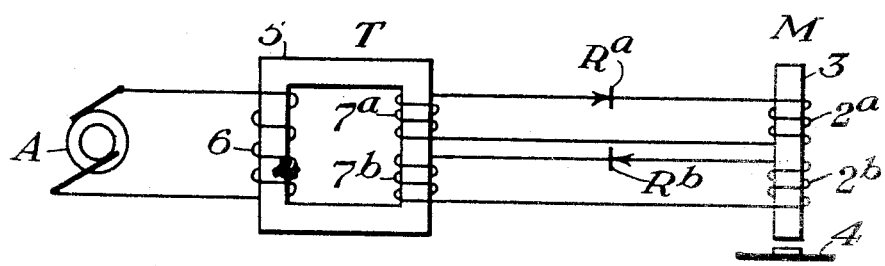
Figure 2:
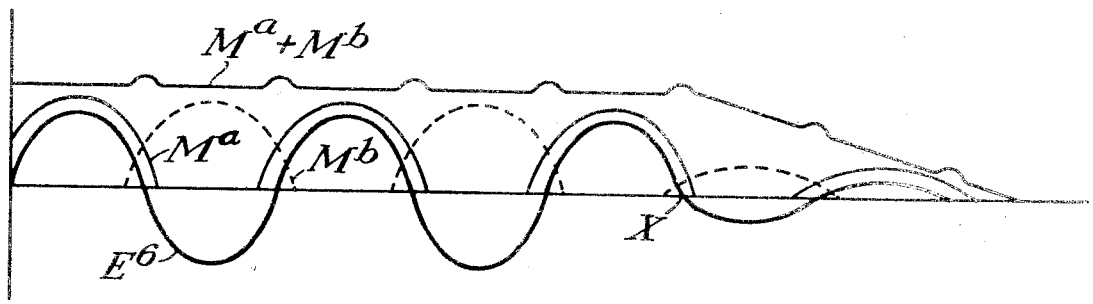

In the accompanying drawing, Fig. 1 is a diagrammatic view showing one form of apparatus embodying my invention, and Fig. 2 is a chart showing certain electrical and magnetic characteristics of the apparatus shown in Fig. 1.

Referring first to Fig. 1, the reference character M designates an electromagnet having a magnetizable core 3 and two windings $2^a$ and $2^b$. The windings of magnet M are supplied with current from a transformer T having a magnetizable core 5 provided with a primary 6 and two secondaries $7^a$ and $7^b$. The primary 6 is supplied with alternating current from a suitable source, such as a generator A.

Winding $2^a$ of magnet M is provided with a circuit which includes secondary $7^a$ of transformer T, whereas, winding $2^b$ of magnet M is provided with a circuit which includes the other secondary $7^b$ of transformer T. The circuit for magnet winding $2^a$ includes an asymmetric unit $R^a$, and the circuit for magnet winding $2^b$ includes an asymmetric unit $R^b$, these units being so connected that current is supplied to magnet winding $2^a$ during one half of each wave of the alternating current in the transformer winding 6, and that current is supplied to the other magnet winding $2^b$ during the other half of each wave of the alternating current in primary 6. The windings $2^a$ and $2^b$ are further so connected that the magnetomotive forces created by these windings in the magnet core 3 are in the same direction.

Referring now to Fig. 2, the curve $E^6$ represents the electromotive force applied to the primary 6 of transformer T. The curve $M^a$ represents the magnetomotive force created in the core of magnet M during the positive half of each wave, and the curve $M^b$ represents the magnetomotive force created in magnet core during the negative half of each wave of the alternating current. The curve designated $M^a$ plus $M^b$ represents the sum of the magnetomotive forces created in core 3 by the two windings $2^a$ and $2^b$. The magnet M is designed for operation by the direct current, and, consequently, it operates efficiently in response to the total magnetomotive force created in its core by the half waves of alternating current supplied to the windings $2^a$ and $2^b$.

The reference character X, in Fig. 2, indicates the point at which the supply of alternating current to the primary 6 is discontinued, and the portion of the curve $E^6$ to the right of point X indicates that the electromotive force very quickly dies down to zero value. Owing to the fact that neither winding $2^a$ nor $2^b$ is provided with a short-circuited path through the asymmetric unit $R^a$ or $R^b$ in such direction as to delay the decay of flux in the magnet core, the fluxes represented by the curves $M^a$ and $M^b$ die down almost as rapidly as the electromotive force $E^6$, with the result that magnet M releases its armature without delay when the source of electromotive force applied to primary 6 is discontinued. In other words, the magnetomotive force in the core 3 of magnet M follows the applied alternating current voltage almost instantly, independently of the time constants of the magnet M, with the result that all the advantages of high sensitivity of a direct current magnet may be retained. Furthermore, the normal magnetomotive force in the relay core is fairly constant, so that the iron losses in the relay are relatively small.

Although I have herein shown and described only one form of apparatus embodying my invention, it is understood that various changes and modifications may be made therein within the scope of the appended claim without departing from the spirit and scope of my invention.

Having thus described my invention, what I claim is:

In combination, an electromagnet having two windings, a transformer having a primary and two secondaries, a source of alternating current for the primary of said transformer, a circuit for one of said magnet windings including one of said transformer secondaries, a circuit for the other magnet winding including the other of said transformer secondaries, two asymmetric units one included in the circuit for each magnet winding and so connected that current is supplied to one winding during one half of each wave of the alternating current in said primary and to the other winding during the other half of each wave of the alternating current in said primary, and said magnet windings being so connected that the magnetomotive forces created by the currents therein in the magnet core are in the same direction.

In testimony whereof I affix my signature.

PAUL N. BOSSART.